(No Model.)

J. TWEDELL.
GATE.

No. 434,850. Patented Aug. 19, 1890.

Witnesses,

Inventor:
Joseph Twedell.
By James L. Norris.
Atty.

UNITED STATES PATENT OFFICE.

JOSEPH TWEDELL, OF CIVIL BEND, MISSOURI.

GATE.

SPECIFICATION forming part of Letters Patent No. 434,850, dated August 19, 1890.

Application filed February 25, 1890. Serial No. 341,738. (No model.)

*To all whom it may concern:*

Be it known that I, JOSEPH TWEDELL, a citizen of the United States, residing at Civil Bend, in the county of Daviess and State of Missouri, have invented new and useful Improvements in Gates, of which the following is a specification.

This invention relates to that class of swinging farm-gates which can be swung open or closed from either side and be adjusted vertically to any required elevation in order to avoid obstructions on the ground and to permit the passage beneath the closed gate of poultry or small animals.

The objects of my invention are to improve the prior construction of this type of gate and provide means for adjustably hanging the gate so that a simple and economical structure is obtained that possesses all the requirements for strength, durability, and efficiency.

To accomplish these objects my invention involves the features hereinafter described and claimed, reference being made to the accompanying drawings, in which—

Figure 1:
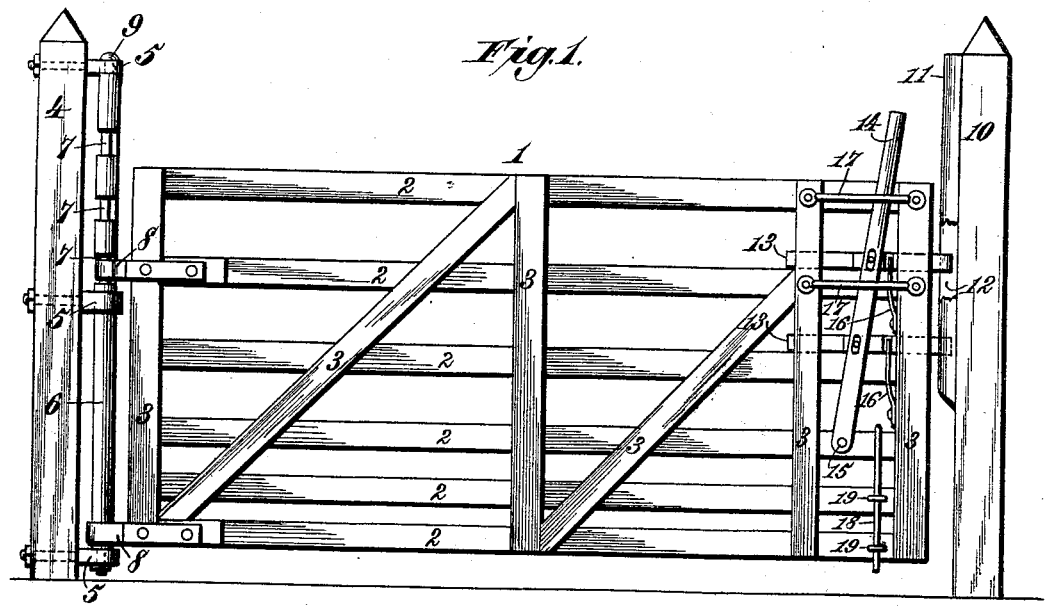
Figure 2:
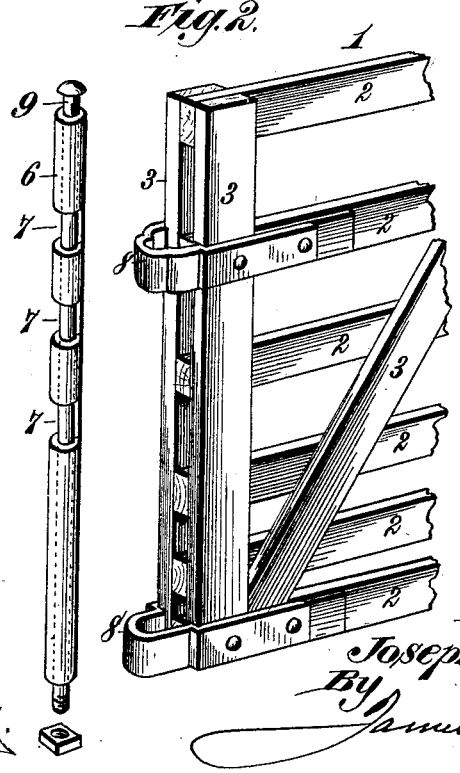

Figure 1 is a side elevation of a gate embodying my invention. Fig. 2 is a detail view of the attachment to the hinge-post for enabling the gate to be adjusted to the required distance above the ground.

Referring to the drawings, the numeral 1 designates a gate, which may be composed of horizontal rails 2 and uprights 3, as usual.

To the hinge-post 4 are secured at suitable intervals a series of brackets 5, to which is attached a vertical metal tube 6, that may consist of a gas-pipe of proper diameter and strength. In that side of the tube 6 which is toward the hinge-post is cut at any desired interval a series of notches or openings 7, to receive and form seats for the upper hinge 8 of the swinging gate. It will thus be observed that by pushing the gate slightly toward the hinge-post and disengaging the upper hinge from the seat in which it rests, the gate can be raised or lowered any required distance, and the said upper hinge be engaged with another opening or seat 7 in the tube 6, so as to support the gate in the desired position. In the center of the tube 6 is supported a vertical rod 9, which serves to brace and strengthen said tube and assists in forming proper bearings for the upper hinge. The lower gate-hinge simply surrounds and slides on the tube 6 as the gate is raised or lowered, and does not need a seat.

The latch-post 10 is provided on the side toward the gate with a pair of vertical cleats 11, which together form a groove 12 to receive the engaging ends of a pair of latches 13, that are attached to and operated by a vertical hand-lever 14, the lower end of which is pivoted at 15 to one of the horizontal rails of the gate. By throwing the lever 14 backward or toward the hinged end of the gate the latches 13 will be disengaged from the groove 12 to permit the gate to be opened, and when the gate is closed the latches 13 are held in engagement with the latch-post by means of springs 16 connected with said latches.

On the upper rails of the gate may be attached guides 17 to assist in supporting the latch-lever 14 and to limit its backward throw in unfastening the gate.

A rod 18 may be hung on the gate in guides 19 to be lowered and thrust into the ground, so as to hold the gate when open.

The manner of operating the gate will be readily understood, and it will be seen that the means for adjusting the gate vertically are simple and inexpensive, while strength and durability are secured by the rod 9, which extends continuously through the gas-piping 6 to form a strengthening core thereto, and at the same time subserves the function of a pintle-bearing for the uppermost hinge in any position to which the gate may be adjusted. The formation of the notches 7 in the pipe or tube enables the upper hinge to have a circular bearing on the lower end of each notch, which is nearly coextensive with the lower end of the eye portion of the upper hinge, whereby the gate has a smoother swinging motion and its durability is increased.

What I claim as my invention is—

The combination, with the hinge-post of a gate, of the upper and lower brackets on the post, the vertical tube having its upper end portion provided with a series of notches, the rod extending continuously in the tube and exposed at the notches to form pintle-bearings for the eye portion of the uppermost gate-hinge, and the gate having an upper hinge adapted to be moved from one notch to another, and a lower hinge movable on the tube, substantially as described.

In testimony whereof I have affixed my signature in presence of two witnesses.

JOSEPH TWEDELL.

Witnesses:
GEORGE CLAPPER,
WM. B. POSTON.